United States Patent [19]
Stubits et al.

[11] 4,035,572
[45] July 12, 1977

[54] METHOD OF MAKING CHEWING GUM BASE

[75] Inventors: Marcella C. Stubits, St. Louis; James Teng, St. Louis County, both of Mo.

[73] Assignee: Anheuser-Busch, Incorporated, St. Louis, Mo.

[21] Appl. No.: 576,170

[22] Filed: May 9, 1975

[51] Int. Cl.$^2$ .......................................... C08B 31/16
[52] U.S. Cl. .................................... 536/108; 426/3
[58] Field of Search .................... 260/233.3, 233.5; 536/108

[56] References Cited

U.S. PATENT DOCUMENTS 3,883,666  5/1976  Teng et al. .............................. 426/3

Primary Examiner—Melvyn I. Marquis
Attorney, Agent, or Firm—Gravely, Lieder & Woodruff

[57] ABSTRACT

This application involves a process of making chewing gum base which is basically hydroxypropyl starch acetate. This process involves preparation of the hydroxypropyl starch acetate gum and separation and purification of the gum from an emulsion state.

13 Claims, 1 Drawing Figure

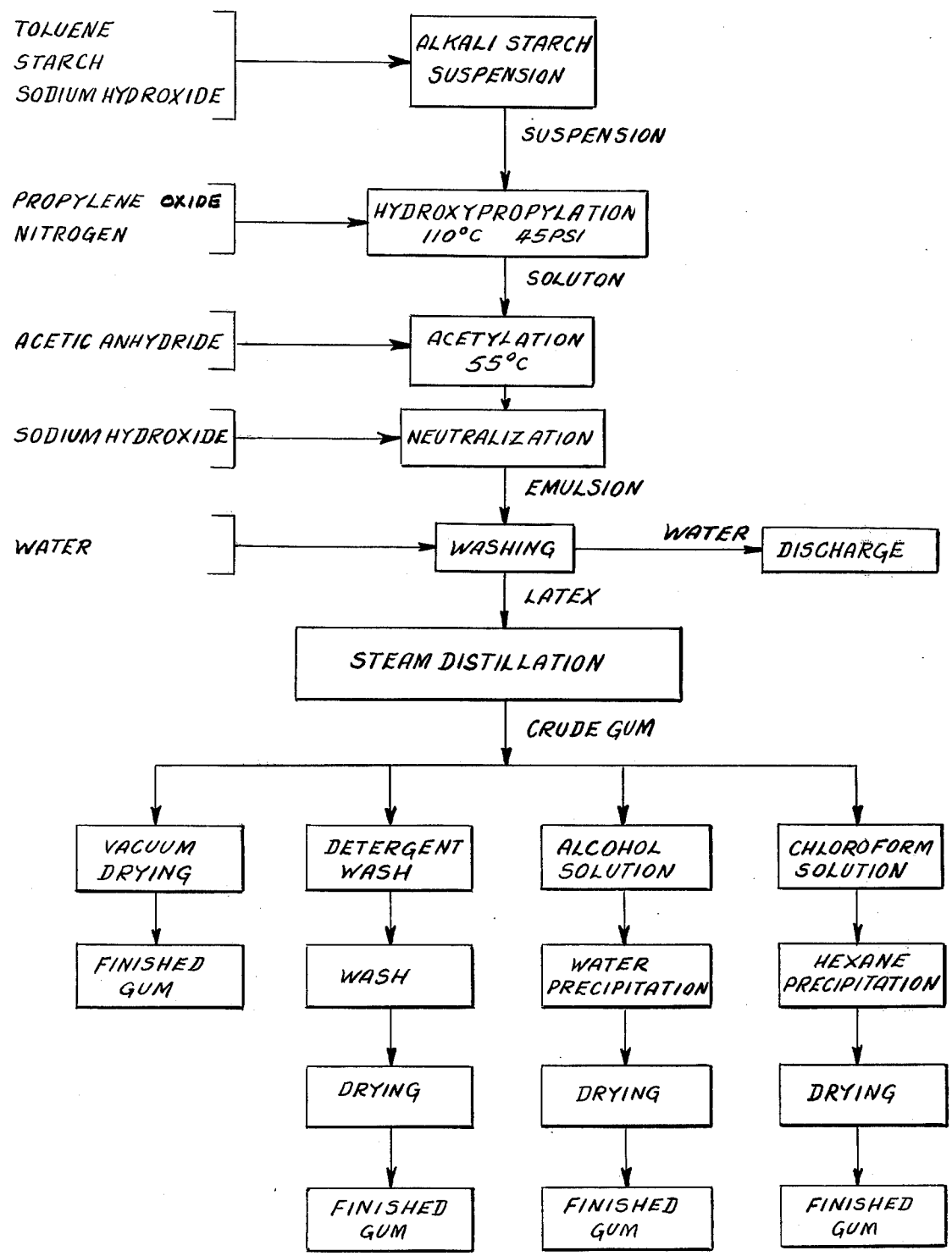

METHOD OF MAKING CHEWING GUM BASE

REFERENCE TO PRIOR APPLICATIONS

This application is a continuation-in-part of and contains subject matter in common with Teng and Stubits application Ser. No. 450,052, filed Mar. 11, 1974 entitled CHEWING GUM BASE AND CHEWING GUM MADE THEREFROM which will issue on May 13, 1975 as U.S. Pat. No. 3,883,666.

BACKGROUND OF THE INVENTION

Chewing gum consists of two major portions, masticatory and non-masticatory. The masticatory portion is usually called chewing gum base, and often includes filler, while the non-masticatory portion consists mostly of sweetening and flavoring ingredients.

For a long time, natural water-insoluble gums of vegetable origin, i.e., chicle, were used for the major portion of chewing gum base. Unfortunately, the natural gums are subject to substantial price fluctuations as well as unpredictability of supply. Because of these reasons, manufacturers have in recent years tried with varying degrees of success to duplicate the desirable properties of natural gum by means of synthetic resins, rubber and other polymers.

U.S. Pat. No. 3,396,038 and patents referred to therein give representative showings of the art with respect to synthetic resin bases, particularly those of polyvinyl acetate derivation. The prior art also includes gum bases such as gluten (U.S. Pat. Nos. 2,586,675 and 1,700,387), prolamine (U.S. Pat. No. 3,469,861), and Zein (U.S. Pat. No. 2,489,147).

In U.S. Pat. No. 3,666,492 issued May 20, 1972 to Teng and Rha there is disclosed a fatty acid ester of starch as a chewing gum base. The invention of U.S. Pat. No. 3,666,492 involves a saturated fatty acid having from 8-14 carbon atoms (specifically starch laurate), and a degree of substitution of above 2.

In Ser. No. 450,052 there is disclosed a chewing gum base made from hydroxypropyl starch acetate having a degree of molecular substitution of hydroxypropyl radicals of about 3 to about 6 and a degree of substitution of acetyl groups of about 1.0 to about 2.5. Application Ser. No. 450,052 discloses the preparation of hydroxypropyl starch acetate from hydroxypropyl starch and acetic anhydride in toluene. The hydroxypropyl starch acetate is dissolved in the toluene, washed, and then hydroxypropyl starch acetate is precipitated from the toluene by adding hexane. The gum is purified by dissolving in chloroform, precipitating in hexane, and drying in a vacuum oven overnight.

The present invention described improved methods of making the gum base which is disclosed and claimed in Ser. No. 450,052. In the present process all reactants are maintained in either solution or emulsion form and this results in the following advantages over the process of Ser. No. 450,052:

1. The constituents of the entire process are conveniently handled as liquids rather than as sticky, elastic globs. That means the liquid can be efficiently stirred or easily transferred by pumping.

2. The uniformity of all reactions (hydroxypropylation, acetylation, and neutralization), is assured.

3. Washing the gum in an emulsion state is effective and efficient. In contrast, the wash of solid gum is extremely laborious if not impossible.

4. The toluene is easily recovered from the latex mass by steam distillation or vacuum evacuation.

5. The crude gum can be effectively purified by several means such as vacuum drying, steam distillation and solvent extraction.

Accordingly, it is one of the principal objects and advantages of this invention to provide a method of making a chewing gum base product maintaining all reactions in solution or emulsion form and resulting in easy materials handling and purification of the final product.

The present invention comprises a process of making a hydroxypropyl starch acetate which is suitable for use as a chewing gum base. The invention further comprises the processes hereinafter described and claimed.

The drawing is a schematic flow diagram of the process of this invention.

DETAILED DESCRIPTION

The starch which is suitable for use in this invention can be unmodified corn starch, wheat starch, rice starch, waxy maize starch, and the like. The starch is in granular form and has a degree of fluidity of 0 to 80 as measured by the method described in Kerr, Chemistry and Industry of Starch, 2nd. Ed., page 133.

In preparing the process of this invention, for each 1,000 grams of starch from about 1 to about 10 liters, preferably about 7 liters, of toluene is placed in a 10 gallon pressure reactor and the starch is suspended in the toluene. To the suspension is added an aqueous alkaline solution, preferably sodium hydroxide solution with rapid mixing. From about 40 to about 400 ml. of 20 to 50% sodium hydroxide solution, preferably about 200 ml. of 25% NaOH solution, is added to the starch-toluene suspension. This material is then stirred for about 15 to about 60 minutes, preferably about 30 minutes. The temperature of the starch suspension is maintained at about 20° to about 35° C., prefrably about 25° C., during the mixing period. The suspension is mixed until the starch is completely swollen.

To prevent degradation of the starch, the reactor is purged with nitrogen by bringing the nitrogen pressure in the reactor to about 60 psi and releasing. This procedure is repeated. The purging takes place during the initial stirring period.

From about 2,000 to about 5,000 ml. of propylene oxide, preferably about 4,000 ml., is added under vacuum to the starch suspension. The vacuum is about 50 to about 150 mm Hg., preferably about 100 mm Hg. The addition of the propylene oxide takes about 15 to about 30 minutes. The temperature is maintained at about 20 to about 30° C., preferably about 25° C., during the addition of propylene oxide. Thereafter, the mixture in the reactor is heated to about 110° C. gradually over a 1 hour period. The pressure in the reactor during the heating phase builds up to about 45 to about 85 psi. The material is held at a temperature of about 110° C. until the pressure in the vessel drops to about 20 psi, which takes about 1 to about 6 hours. The reaction temperature can be from about 85° to about 140° C., but the preferred temperature is 110° C.

The reactants are then cooled to about 20° to about 50° C., preferably to about 40° C., and about 1,000 to about 5,000 ml. of acetic anhydride, preferably about 2,000 to about 4,000 ml. acetic anhydride, is added over a period of about 15 to about 30 minutes. When the addition of acetic anhydride is completed, the mixture is heated to about 50° to about 80° C., preferably about 60° C., and maintained at that temperature for about 1 to about 3 hours to complete the reaction. The reactants then are cooled to about 20° to about 30° C., preferably to about 25° C. The mixture then is neutralized with aqueous sodium hydroxide of about 10% to about 50% strength, with good agitation, to a pink phenolphthalein endpoint. Thereafter, the mixture is adjusted to pH 7 with acetic acid.

At this point, the material is in emulsion form and the emulsion is washed with volumes of water at a temperature of about 25° to about 50° C. until the gum coagulates as a salt-free toluene solvated white latex mass. About 15 to about 30 gallons of water is introduced into the emulsion mixture for each wash. After each wash the emulsion is allowed to break and the bottom layer is drained off. The bottom layer contains the water and water soluble compounds. After about 10 washes, the gum is removed and thereafter the toluene remaining in the gum is stripped off and the gum is dried by any of the following methods.

The gum is purified until the toluene and water are at an acceptable level which is that level which does not affect the taste or odor of the final chewing gum product. This can vary depending on the flavors added to the final gum. Generally, we want the toluene level to be below about 600 ppm and the water to be below about 1%. Preferably, the toluene level is below 200 ppm and the gum base itself is tasteless and odorless. For formulating purposes, the final water level preferably is below about 0.5%.

The first method is to remove any solvent and water in a suitable thin film evaporator which is capable of handling the viscous, adhesive gum without any stagnant material in the process equipment. In this process, the crude gum is placed on the evaporator at a rate of about 1 pound/min. and is treated at a temperature of about 110° to about 220° C. and a pressure of about 1 mm Hg to about 50 mm Hg for about 4 to about 10 minutes, preferably 5 minutes. The toluene is flashed off, and pure dry gum extruded.

A second general method involves removing the gross toluene by steam distillation followed by a final purification step. The steam distillation involves the use of steam at a temperature of about 100° to about 130° C. applied to the latex mass for a period of about 30 to about 120 minutes.

Thereafter, the latex is given a final purification by steaming in a detergent solution which consists of 0.5 to 10% detergent. About 0.01 to about 1 part of detergent is used per part of latex mass. The material is steamed at a temperature of about 100° to 130° C. for a period of about 1 to 4 hours, washed free of detergent, and vacuum-dried in a sigma blade kneader or tray-dried at a vacuum of about 50 to about 150 mm Hg and a temperature of 60° to 80° C.

In the alternative the gum can be forced air oven dried at a temperature of about 60° to about 80° C. for 8 to 12 hours.

Another final purification procedure is to dissolve the gum in 1,000 ml. of ethanol per 800 grams of gum. Then about 1,000 to about 5,000 ml. of cold water/1000 ml. ethanol is added to precipitate the gum from the ethanol. The ethanol is steam distilled by appying steam at a temperature of about 100° to about 130° C for about 30 to about 120 minutes. The gum then is dried by any of the previously described methods.

Still another final purification method is to dissolve the gum in 1,000 ml. of chloroform/200 grams gum and add about 2,000 ml. of hexane per 1,000 ml. of chloroform to precipitate the gum from the chloroform. After the chloroform and hexane liquid are decanted off, the gum is relatively pure except for whatever adherent solvent is attached thereto. This is removed in a final step in which the gum is vacuum-dried in a kneader or forced air oven dried as previously described.

Following are specific preferred examples showing various methods of practicing the invention.

EXAMPLE NO. I

In a ten gallon Pfaudler reactor, 1,000 grams pearl starch was slurried in 10 liters toluene. With rapid agitation 400 ml. of 25% sodium hydroxide was slowly added, and stirred for 30 minutes to swell the starch. The reactor was purged three times with nitrogen at 50 psi and 4295 grams propylene oxide was added under reduced pressure. The mixture was slowly heated to 110° C. (pressure 50 psi) and held at this temperature for 2 hours (pressure 20 psi). The mixture was cooled to 25° C. and 4860 grams acetic anhydride was added. The mixture was heated to 55° C. and held at this temperature for 2 hours, cooled to 25° C. and neutralized with 25% sodium hydroxide to a phenophthalein endpoint. The pH was adjusted to 7 with acetic acid.

The emulsion was transferred to a 40 gallon stainless steel kettle equipped with an agitator and a bottom drain. Twenty gallons of water was added and mixed for 15 minutes. The emulsion was allowed to break and the bottom layer was drained. The washing was repeated until the gum coagulated as a salt-free white latex mass. Twenty gallons of hot water plus 3 pounds anionic detergent were added and the mix was steamed under a hood until the gum contained less than 200 ppm toluene (as measured on a gas chromatograph). The gum was washed until it was detergent free. The water wet elastic mass contained 30% moisture and was vacuum dried at 60° C. in a sigma blade double arm kneader. The dried gum was an off-white, tough elastic mass and the yield was 2675 grams.

EXAMPLE NO. II

In a 10 gallon Pfaudler reactor, 1,000 grams waxy maize starch was dispersed in three liters of toluene. Fifty (50) ml. 25% sodium hydroxide were added with rapid agitation. The mass was mixed for 30 minutes at room temperature and purged three times with nitrogen (60 psi) during mixing. Propylene oxide (3150) grams was added, heated slowly to 110° C. and held at this temperature for 6 hours (pressure 20 psi). The product was cooled to 25° C. and 2650 grams of acetic anhydride were added. The mixture was heated to 80° C. and held for three hours, cooled to 25° C., and neutralized with 10% sodium hydroxide to pH 7. The emulsion was transferred to a 40 gallon stainless steel kettle and washed five times with warm water (40° C.). The emulsion was allowed to break after each (approximately 15 minutes) and the bottom layer was drained off. The gum remainded in the top toluene layer. The gross toluene was steamed off under a hood until the gum became a sticky viscous mass. The mass was cooled and one gallon of 95% ethanol was added to dissolve the gum. Five gallons of water was added to coagulate the gum and again the water layer was drained off. Twenty gallons of water was added and the mix was steamed until the gum was tasteless. The gum was tray-dried in a forced air oven at 80° C. The yield was 2475 grams of tough, pale yellow gum.

EXAMPLE NO. III

Powdered corn starch (80 grams) was dispersed in 800 ml. toluene and 25 ml. 25% sodium hydroxide was added with rapid mixing. The mixture was transferred to a two liter Parr pressure reactor, propylene oxide (240 ml.) added, the vessel sealed and purged three times with nitrogen at 80 psi, then heated to 115° C. and held at this temperature for 2 hours. Acetic anhydride (200 ml.) plus sodium acetate (10 grams) was added; the mixture was heated to 75° C. and wash held at this temperature for 2 hours. The mixture was cooled, neutralized with 25% sodium hydroxide, transferred to a large separator funnel, and washed siz times with water. 1,000 ml. of chloroform was added, the gum solution was drained into a beaker, and was precipitated with 2,000 ml. hexane. The gum was dried in a vacuum oven overnight at 60° C. The yield was 180 grams.

EXAMPLE NO. IV

Fifty-three pounds of pearl starch was dispersed in 65 gallons toluene in a 500 gallon Pfaulder reactor and 25% sodium hyroxide (2.4 gallons) as added with rapid mixing. The vessel was sealed and the mixture stirred for 45 minutes. The vessel was purged two times with nitrogen (45 psi) during this time. Propylene oxide (183 pounds) was sucked in under reduced pressure; the mixture was heated to 110° C. within 1 hour and held at this temperature for 2 hours; the reaction mix was then cooled to 45° C. 270 pounds of acetic anhydride was added and the temperature rose to 80° C. and then dropped to 60° C. over a period of 2 hours. The mixture was cooled to 30° C., 3% phenolphthalein (100 ml.) was added, and the mixture was neutralized to a pink endpoint with 25% sodium hydroxide. The sides of the reactor were washed down; the vessel was filled two-thirds full with water; and the pH was adjusted to 7 with acetic acid. The gum emulsion was washed five times with 200 gallons of water (40° C.); stirred for 15 minutes; and allowed to stand 15 minutes before the water was drained after each wash. After complete removal of water soluble salts, the gum-toluene dispersion was pumped into a thin film evaporator for complete solvent recovery and extrusion of pure dry gum. Because of the sticky, elastic nature of the gum, not all thin film evaporators can handle the solvent removal step of the process. One piece of suitable equipment is the POLY-CON* continuous reactor of Baker-Perkins, Inc. The unit consists of two co-rotating rotors of special design and they are fitted closely in twin barrels. The rotors continuously wipe themselves and the barrel surface. The result is a rapid generation of new surface for continuous solvent removal. The thorough wiping action also leaves no stagnant areas that may promote thermal degradation of the gum. For this example, the operating conditions using a single stage, 4 inch diameter POLY-CON were the following:

| | |
|---|---|
| Temperature | 170° C. |
| Pressure | 10 mm Hg. |
| Rotor speed | 100 rpm |
| Residence time | 6 min. |
| Crude gum feed rate | 60 lbs./hr. |

All volatile solvents were removed efficiently by this special thin film evaporator and a yield of 130 pounds of pure dry gum was extruded from this unit.

*This unit is described in Todd, D. B. and Irving, H. F., Chem. Eng. Progress, Vol. 65, No. 9 pages 84–89 (1969)

What is claimed is:
1. A method of preparing a hydroxypropyl starch acetate suitable for use as a chewing gum base ingredient comprising the steps of:
  A. suspending starch in toluene,
  B. adding alkali to the starch suspension of A,
  C. reacting the starch with propylene oxide and subsequently with acetic anhydride to produce hydroxypropyl starch acetate,
  D. neutralizing the reaction mixture to form an emulsion containing the hydroxypropyl starch acetate gum,
  E. washing the emulsified gum with water until the gum coagulates as a salt-free toluene solvated latex mass,
  F. separating the emulsion containing the toluene solvated gum from the water, and
  G. reducing the solvent and water remaining in the gum to an acceptable concentration level.
2. The method of claim 1 wherein the reaction vessel is purged with nitrogen after addition of alkali and prior to the addition of propylene oxide.
3. The method of claim 2 wherein the propylene oxide is reacted with the starch at a temperature of about 85° to about 140° C. for about 1 to about 6 hours at a pressure up to about 85 psi.
4. The process of claim 3 wherein acetic anhydride is added to the starch-propylene oxide reaction mixture at a temperature of about 20° C. to about 80° C. and is maintained at said temperatures for about 1 to about 3 hours.
5. The process of claim 1 wherein the toluene is removed from the gum by applying the mix to a thin film evaporator for 2 to 20 minutes at a temperature of 110 to 250° C. and a pressure of 1 to about 50 mm Hg.
6. The process of claim 1 wherein the toluene is removed from the gum by steam distillation at a temperature of about 100° to about 130° C. for about 1 to about 4 hours.
7. The process of claim 6 wherein the gum remaining from the steam distillation is purified by steaming at a temperature of 100° to 130° C. for 1 to 4 hours in a solution containing 0.01 to 1 part detergent per part gum, washing the gum detergent free, and drying the gum.
8. The process of claim 6 wherein the gum remaining from the steam distillation is purified by adding about 200 ml. ethanol per 100 grams gum, precipitating the gum with water, steam distilling the ethanol, and drying the precipitate.
9. The process of claim 6 wherein the gum remaining from the steam distillation is purified by dissolving the same in about 1000 ml. chloroform/200 grams gum and adding about 2000 ml. hexane per 1000 ml. chloroform to precipitate the gum, separating the solids from the liquid, and drying the solids.
10. The method of claim 1 wherein about 1 to about 10 liters of toluene are used per 1,000 grams of starch.
11. The method of claim 1 wherein about 0.008 to about 0.2 parts alkali (calculated as NaOH equivalent) by weight, per part of starch based on the weight of the starch, is added to the starch suspension.
12. The method of claim 1 wherein about 2 to about 5 liters of propylene oxide and about 1 to about 5 liters of acetic anhydride are used per 1,000 grams of starch to produce hydroxypropyl starch acetate.
13. The method of claim 1 wherein the reaction mixture of Step D is neutralized with aqueous sodium hydroxide.

* * * * *